US012757310B2

(12) United States Patent
Vinokhodov et al.

(10) Patent No.: US 12,757,310 B2
(45) Date of Patent: Oct. 6, 2026

(54) HIGH BRIGHTNESS LPP EUV LIGHT SOURCE WITH FAST ROTATING TARGET AND METHOD OF COOLING THEREOF

(71) Applicants: ISTEQ GROUP HOLDING B.V., Eindhoven (NL); ISTEQ B.V., Eindhoven (NL)

(72) Inventors: Aleksandr Yurievich Vinokhodov, Troitsk Moscow (RU); Vladimir Vitalievich Ivanov, Moscow (RU); Konstantin Nikolaevich Koshelev, Troitsk Moscow (RU); Mikhail Sergeyevich Krivokorytov, Moscow (RU); Vladimir Mikhailovich Krivtsun, Troitsk Moscow (RU); Aleksandr Andreevich Lash, Moscow (RU); Vyacheslav Valerievich Medvedev, Troitsk Moscow (RU); Yury Viktorovich Sidelnikov, Troitsk Moscow (RU); Oleg Feliksovich Yakushev, Moscow Region Korolyev (RU); Denis Alexandrovich Glushkov, Nieuwegein (NL); Samir Ellwi, Crawley (GB); Oleg Borisovich Khristoforov, Moscow (RU)

(73) Assignee: ISTEQ GROUP HOLDING B.V., Eindhoven (NL)

( * ) Notice: Subject to any disclaimer, the term of this patent is extended or adjusted under 35 U.S.C. 154(b) by 374 days.

(21) Appl. No.: 18/519,456

(22) Filed: Nov. 27, 2023

(65) Prior Publication Data

US 2024/0121878 A1 Apr. 11, 2024

Related U.S. Application Data

(63) Continuation-in-part of application No. 17/569,737, filed on Jan. 6, 2022, now Pat. No. 12,028,958, and a (Continued)

(51) Int. Cl.
*H05G 2/00* (2006.01)

(52) U.S. Cl.
CPC ............. *H05G 2/002* (2024.08); *H05G 2/009* (2024.08)

(58) Field of Classification Search
CPC ............................... H05G 2/002; H05G 2/009
See application file for complete search history.

(56) References Cited

U.S. PATENT DOCUMENTS

2010/0258748 A1* 10/2010 Vaschenko ........... H05G 2/0025 250/504 R
2015/0282285 A1* 10/2015 Shirai .................... H05B 41/30 315/246
2016/0290223 A1* 10/2016 Mills ......................... C01B 3/00

FOREIGN PATENT DOCUMENTS

NL 2012588 A * 10/2014 ......... G03F 7/70033

* cited by examiner

*Primary Examiner* — Georgia Y Epps
*Assistant Examiner* — Hanway Chang
(74) *Attorney, Agent, or Firm* — Nadya Reingand

(57) ABSTRACT

A laser produced plasma (LPP) light source comprises a rotating target assembly supplying a target into an interaction zone with a focused beam of a high-repetition-rate pulsed laser. High effective cooling of the light source is provided by thermal radiation of a peripheral part of the rotating target assembly and through a meander-shaped gap between the rotating target assembly and a fixed heat exchanger with a gas blowing through the slit gap. In an embodiment, a sealing between the vacuum chamber and a shaft of rotating drive unit is provided by a magnetic fluid seal (MFS) with an additional heat exchanger. A heat transfer from the rotating target assembly is provided through the shaft and MFS to additional heat exchanger and by convection air cooling of a counterweight of the rotating target (Continued)

assembly fixed on the shaft. High brightness and high output power of LPP light source are provided.

13 Claims, 2 Drawing Sheets

Related U.S. Application Data continuation-in-part of application No. 16/952,587, filed on Nov. 19, 2020, now Pat. No. 11,252,810, and a continuation-in-part of application No. 16/773,240, filed on Jan. 27, 2020, now Pat. No. 10,887,973, and a continuation-in-part of application No. 16/535,404, filed on Aug. 8, 2019, now Pat. No. 10,588,210, and a continuation-in-part of application No. 16/103,243, filed on Aug. 14, 2018, now Pat. No. 10,638,588, and a continuation-in-part of application No. 17/604,922, filed as application No. PCT/RU2020/050083 on Apr. 26, 2020, now Pat. No. 11,869,742.

HIGH BRIGHTNESS LPP EUV LIGHT SOURCE WITH FAST ROTATING TARGET AND METHOD OF COOLING THEREOF

CROSS-REFERENCE TO RELATED APPLICATIONS

This patent application is a Continuation-in-part of U.S. patent application Ser. No. 17/604,922 filed Oct. 19, 2021, being a National stage application from the PCT application PCT/RU2020/050083 claiming priority to Russian applications RU2019113052 filed Apr. 26, 2019; RU2019113053 filed Apr. 26, 2019; RU2020103063 filed Jan. 25, 2020; this patent application also is a Continuation-in-part of U.S. patent application Ser. No. 17/569,737 filed Jan. 6, 2022, which in turn is a Continuation-in-part of U.S. patent application Ser. No. 16/952,587 filed Nov. 19, 2020, which in turn is a Continuation-in-part of U.S. patent application Ser. No. 16/773,240 filed Jan. 27, 2020, which in turn is a Continuation-in-part of U.S. patent application Ser. No. 16/535,404, filed on Aug. 8, 2019, which in turn is a Continuation-in-part of U.S. patent application Ser. No. 16/103,243, filed on Aug. 14, 2018, with priority to Russian patent application RU2017141042 filed Nov. 24, 2017, U.S. patent application Ser. No. 17/569,737 also claims priority to Russian patent application RU2021132150 filed Nov. 4, 2021, all of which are incorporated herein by reference in their entireties.

FIELD OF THE INVENTION

The invention relates to high-brightness laser-produced plasma (LPP) light sources designed to generate extreme ultraviolet (EUV) and vacuum ultraviolet (VUV) light at wavelengths of approximately 5 to 125 nm, which provide highly effective debris mitigation by use a fast rotating target to ensure the long-term operation of the light source and its integrated equipment, and further relates to the method for cooling high-brightness LPP EUV light source with fast rotating target.

BACKGROUND OF THE INVENTION

High-brightness EUV light sources are used in many fields: microscopy, materials science, biomedical and medical diagnostics, materials testing, crystal and nanostructure analysis, atomic physics, and lithography. Moreover, the higher the average output power of an EUV light source, the higher the performance of the device created on the basis of such a source.

Synchrotrons can be used as such radiation sources, but they are extremely expensive and not available everywhere.

An alternative is sources in which plasma effectively emitting in the EUV range can be obtained both by focusing the radiation of high-power lasers on the target and in the discharge. The EUV light generation is most effective with the use of laser-produced plasma.

During the light generation, debris particles are produced as a by-product, which can degrade the surface of optical collector comprising one or several mirrors located near the light source. The debris can be in the form of high-energy ions, neutral atoms and clusters of target material. While deposition of microdroplets and particles on the collector mirror reduce its reflection, high-velocity particles can damage the collector mirror and, possibly, other parts of the optical system located downstream the collector mirror. This determines the relevance of developing high-brightness short-wavelength light sources with highly effective debris mitigation.

In U.S. Pat. No. 10,638,588 published Apr. 28, 2020, U.S. Pat. No. 10,588,210 published Oct. 3, 2020 and U.S. Pat. No. 10,887,973 published May 1, 2021 a new approach has been proposed for the development of high-brightness short-wavelength LPP light sources based on fast rotating liquid metal target, which provides high-efficient debris mitigating. Actually, the crucial role in the contamination of collector optics in LPP light sources of various types belongs to the droplet fraction of debris particles ejecting from the interaction zone at a relatively low velocity which is efficiently mitigated in accordance the invention due to a fast target's rotation (hundreds of Hz at a linear velocity of over 100 m/s) providing redirecting the overwhelming part of droplets sideways from the optical collector and input window for laser beam. The most deep debris mitigation is provided by use of more debris mitigation techniques, comprising: protective gas flow, a magnetic mitigation, a foil trap, a debris shield, a membrane mostly transparent for EUV radiation.

In a particular embodiment of the invention disclosed in U.S. Pat. No. 10,588,210, heat removal from the rotating target assembly to a liquid-cooled heat exchanger is provided through a layer of liquid metal of a hydrodynamic bearing. The hydrodynamic bearing with liquid metal can withstand very high temperatures. The large bearing contact area and the liquid metal grease provide highly efficient heat dissipation from rotating target assembly. However, the viscosity of the liquid metal prevents the fast rotation of the target assembly and the implementation of the high pulse-repetition-rate mode of operation, that limits an achievement of high output power and brightness of the LPP EUV light source.

In other embodiments of this invention, heat removal by heart radiation is performed. However, a radiative heat transfer also limits the ability to increase the output power and brightness of the LPP EUV light source by increasing the input laser power, resulting in an increase in the temperature of the rotating target assembly. The fast rotating disk of the target assembly is subjected to centrifugal acceleration of tens of thousands of g, and the strength characteristics of the disk material noticeably decrease as the temperature of the disk increases. In addition, an increase in temperature leads to a sharp increase in the chemical interaction between the disk material and the target material, leading to the solubility of one in another. And finally, an increase in the temperature of the rotating disk causes overheating of the bearings on a shaft of a rotation drive unit. All these arguments place special demands on ensuring efficient cooling of the fast rotating target.

SUMMARY OF THE INVENTION

Accordingly, there is a need to eliminate the drawbacks mentioned above. In particular, there is a need for an improved compact, commercially available, low-cost operating, low-debris LPP EUV light sources with fast rotating target that provide a highly efficient increase in the average EUV light output power and brightness.

This need is met by the features of the independent claims. The dependent claims describe embodiments of the invention.

According to an embodiment of the invention, there is provided a laser produced plasma (LPP) extreme ultraviolet (EUV) light source, comprising: a vacuum chamber with a rotating target assembly having a rotation drive unit and a part made in the form of a disk with a barrier on the inner surface of which there is an annular groove with a target material supplied to the interaction zone with a focused beam of a high-repetition-rate pulsed laser, and a beam of EUV plasma light coming out from the interaction zone.

The source characterized in that a heat exchanger with liquid cooling is installed in the vacuum chamber, fixed relative to it; a part of the heat exchanger surface is separated from the surface of the rotating target assembly disk by a or clearance.

In a preferred embodiment of the invention, an outer surface of a peripheral part of the rotating target assembly is made with a large surface area S exceeding $0.5 \times R^2$, where R is the rotating target assembly outer radius, and has a coating with high, more than 0.7, emissivity.

In a preferred embodiment of the invention, the parts of the heat exchanger and the disk of rotating target assembly, facing each other, are equipped with concentric annular fins and the concentric annular fins of the rotating target assembly are located between the concentric annular fins of the heat exchanger.

In a preferred embodiment of the invention, the slit gap has the shape of a meander in the cross-section plane passing through the axis of rotation of the rotating target assembly.

In a preferred embodiment of the invention, the surfaces of the disk of the rotating target assembly and of the heat exchanger, located on both sides of the slit gap, have coatings with high emissivity, more than 0.7, produced, for example, by micro-arc oxidation.

In a preferred embodiment of the invention, a gas input is arranged to provide gas blowing through the slit gap into the vacuum chamber at a gas pressure in the slit gap more than 20 Pa.

In a preferred embodiment of the invention, a size of the slit gap is less than 0.5 mm.

In a preferred embodiment of the invention, the rotation drive unit comprises a shaft, mounted on bearings and an electric motor connected by shaft to the disk of rotating target assembly, said bearings and electric motor are located outside the vacuum chamber, sealing between the vacuum chamber and the shaft is provided by a magnetic fluid seal (MFS), and the bearings and MFS are equipped with an additional heat exchanger with liquid cooling.

In a preferred embodiment of the invention, a counterweight of the rotating target assembly is fixed on the shaft outside the vacuum chamber, and said counterweight is arranged for convection air cooling.

In an embodiment, the electric motor is a brushless DC electric motor.

In a preferred embodiment of the invention, the target has a linear velocity of at least 100 m/s, a centrifugal acceleration of at least 3000 g, where g is the standard acceleration of gravity and the target material has fluidity under the centrifugal force.

In another aspect, the invention relates to a method for cooling of LPP EUV light source with fast rotating target.

The method is characterized in that a by thermal radiation of a peripheral part of the rotating target assembly made with a large surface area S exceeding $0.5 \times R^2$, where R is outer radius of the rotating target assembly further is provided by heat exchange through the slit gap between a disk of the rotating target assembly and a heat exchanger with liquid cooling fixed relative to the vacuum chamber, while surfaces of both the disk and the heat exchanger located on both sides of the slit gap have a coatings with high, more than 0.7, emissivity.

In a preferred embodiment of the invention, through the slit gap between the rotating target assembly and the heat exchanger a gas is blown into the vacuum chamber.

In a preferred embodiment of the invention, a drive unit comprises a shaft, mounted on bearings and an electric motor connected by shaft to the disk of rotating target assembly, said bearings and electric motor are located outside the vacuum chamber, sealing between the vacuum chamber and the shaft is provided by a magnetic fluid seal (MFS), the bearings and MFS are equipped with an additional heat exchanger (with liquid cooling, and a counterweight of the rotating target assembly is fixed on the shaft outside the vacuum chamber and a heat transfer from the disk of rotating target assembly is provided through the MFS with additional heat exchanger and by convection air cooling of the counterweight rotating on the shaft.

The following causal relationships exist between the set of essential features of the present invention and the achieved technical result.

LPP EUV light source is characterized by achieving this goal via using simultaneously several methods of cooling the fast rotating target and the shaft of the rotation drive unit.

Cooling of the peripheral working part of the rotating disk is carried out by two mechanisms: thermal radiation from the heated disk and due to the thermal conductivity through the shaft of the rotation drive unit and through high-pressure gas contacting with rotating disk. As known, the power of thermal radiation from the surface of the disk is determined by the formula:

$$W = \sigma S T^4 \quad (1),$$

where σ—is the emissivity coefficient of the material, S—is the surface area of the disk.

From (1) it follows that to increase the cooling efficiency of the disk, it is necessary to increase both the surface area of the disk and the emissivity coefficient of the disk surface material. Both of these factors are used in this light source to increase the cooling efficiency.

To increase the emissivity factor of the disk surface up to $\sigma \sim 1$, the surface is subjected to special treatment. The surface of the heat exchanger facing the rotating disk is also subjected to special treatment to increase the effective surface emissivity coefficient $\sigma_{ef}$. In this case:

$$\sigma_{ef} = 1/(1/\sigma_{disk} + 1/\sigma_{heatexch} - 1) \quad (2),$$

where $\sigma_{disk}$ и $\sigma_{heatexch}$ are the emissivity coefficients of the disk and heat exchanger, respectively.

Removal of thermal power from the hot peripheral part of the rotating disk according to the second mechanism—due to thermal conductivity, is also implemented via two channels. Firstly, due to heat transfer through the gas in a narrow slit gap between the rotating disk and the stationary heat exchanger. In this case, the surfaces of both the disk and the heat exchanger, facing each other, are made with the largest possible area. To increase the thermal conductivity coefficient of the gas, its pressure in the gap must be several times higher than the pressure in the vacuum chamber. Secondly, due to the transfer of heat through the body of the disk towards its rotating shaft and subsequent cooling of the rotating shaft.

Moreover, due to the high thermal conductivity of the shaft material and high rotation speed of the counterweight, the air convection cooling of the shaft and counterweight unit is also very effective.

The simultaneous use in LPP EUV light source with fast rotating target of all the methods described above for cooling the rotating target assembly makes it possible to increase the output power of the light source several times by increasing the power of laser radiation focused on the target, while ensuring an acceptable temperature of both the target itself and the shaft bearings.

The technical result of the invention is the creation of powerful high-brightness sources of short-wave light with highly effective mitigation of debris and highly efficient cooling of all elements of the rotating target unit.

The advantages and features of the present invention will become more apparent from the following non-limiting description of exemplary embodiments thereof, given by way of example with reference to the accompanying drawings.

BRIEF DESCRIPTION OF DRAWINGS

An Exemplary Implementation of the Invention is Illustrated by the Drawings, in which.

In the drawings, the matching elements of the device have the same reference numbers. These drawings do not cover and, moreover, do not limit the entire scope of the options for implementing this technical solution, but represent only illustrative material of a particular case of its implementation.

DETAILED DESCRIPTION OF THE INVENTION

Figure 1:
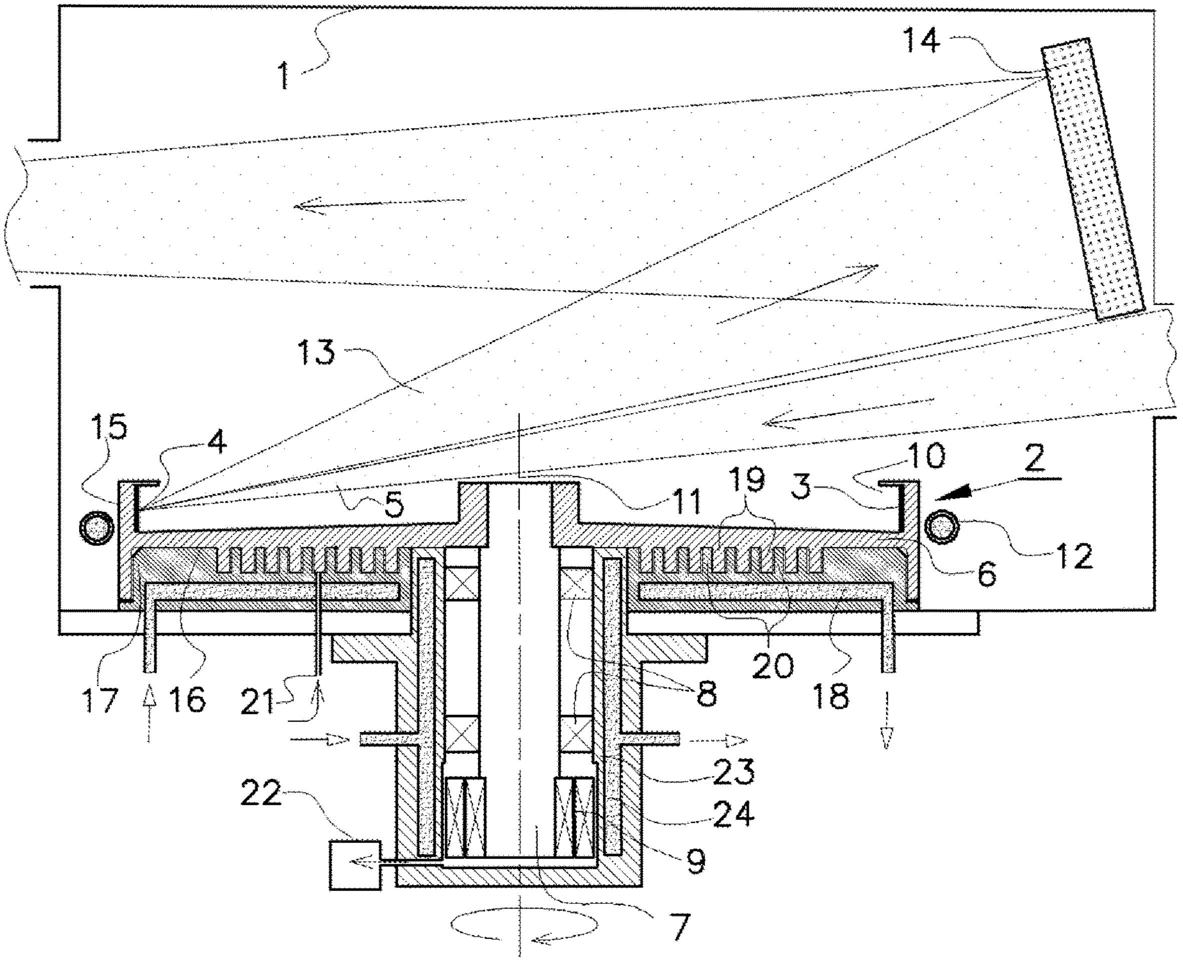
FIG. 1 and FIG. 2 show schematic diagrams of a high brightness LPP EUV light source in accordance with the embodiments.

According to an example of invention embodiment illustrated in FIG. 1, the high-brightness LPP EUV light source contains a vacuum chamber 1 with a rotating target assembly 2 which supplies target 3 to the interaction zone 4 with a focused laser beam 5 of a high-repetition-rate pulsed laser Part of the rotating target assembly 2 is made in the form of a disk 6 rotating by a drive unit comprising of a rotation shaft 7 mounted on bearings 8 and an electric motor 9 connected through the shaft to the disk 6 of rotating target assembly.

Said disk 6 has a peripheral portion in the form of an annular barrier with the annular groove 10 facing the rotation axis 11.

In a preferred embodiment of the invention, the target 3 is a layer of molten metal formed by centrifugal force on the surface of the annular groove 10 of the rotating target assembly 2. The annular groove configuration prevents material of the target 3 from being ejected in the radial direction and in both directions along the rotation axis 11. The rotating target assembly 2 is provided with a fixed heating system 12 for the target material. To keep the target material in a molten state inside the rotating target assembly the heating system 12 should provide no contact induction heating. The fixed heating system 12 may have the option of keeping the temperature of molten metal in the optimal range of temperature. In the mode of maximum output power of the LPP EUV source the heating system is turned off.

In the interaction zone 4 under the action of a focused laser beam 5 a pulsed high-temperature plasma of the target material is generated at a high repetition rate ranging from several tens to hundreds of kHz. The plasma generates short-wavelength light in one or more spectral ranges, which include EUV, VUV and soft X-rays. The short wavelength light to be used leaves the interaction zone 4 in the form of a diverging output beam 13 directed towards an optical collector 14.

To ensure high stability of both the target surface and output parameters of the LPP EUV light source, a fast rotating velocity more than 100 m/s at a centrifugal acceleration of not less than 3000 g is employed whereby the effect of the centrifugal force makes the surface of the liquid metal target 3 parallel to the rotation axis 11, i.e. it is essentially a circular cylindrical surface whose axis coincides with the rotation axis.

Due to fast target rotation, the droplet fraction of debris particles ejecting from the interaction zone acquires a significant tangential velocity component comparable to the linear target velocity. Accordingly, the resulting vector of the droplets velocity will be largely redirected from the cones of focused laser beam 5 and output beam 13.

On the path of the output beam 13 to optical collector 14 there are means for debris mitigation (not shown) provided by one or more techniques comprising: the debris shields installed outside the collection angle and cone of focused laser beam 5; the flows of protective gas arranged to suppress the vapor fraction of debris; a foil trap, highly transparent for plasma light which is essentially a system of plates oriented in radial directions with respect to the plasma, providing a sufficiently effective trapping of neutral atoms and clusters of the liquid metal target material; a magnetic field preferably generated by permanent magnets to mitigate the charged fraction of debris particles; a replaceable membrane essentially transparent for EUV light and impermeable for debris and gas. Similar means for debris mitigation are placed in the propagation path of the focused laser beam 5.

Heat transfer from the fast rotating target is ensured by thermal radiation of an outer surface 15 of a peripheral part of the rotating target assembly 2 made with a large surface area S exceeding $0.5 \times R^2$, where R is the rotating target assembly outer radius. To increase heat transfer, the surface of the peripheral part of the disk of the rotating target assembly has a coating with high, more than 0.7, emissivity. Said coating can be produced by micro-arc oxidation or plasma electrolytic oxidation.

Heat transfer from the target is also provided via the narrow submillimeter slit gap 16 between the disk 6 of the rotating target assembly and the fixed heat exchanger 17 with flow of a cooling liquid 18. A size of the slit gap is less than 0.5 mm, preferably about 0.3 mm.

To improve heat exchange the surfaces of the disk 6 of the rotating target assembly and of the heat exchanger 17, located on both sides of the slit gap 16, have coatings with high emissivity, more than 0.7. For the same purpose the parts of the heat exchanger and the disk of rotating target assembly, facing each other, are equipped with concentric annular fins 19, 20 so that the concentric annular fins 19 of the rotating target assembly are located between the concentric annular fins 20 of the heat exchanger. In this case the slit gap 16 has the shape of a meander in the cross-section plane passing through the axis of rotation 11.

To further improve the cooling efficiency of the rotating target assembly the heat exchanger is equipped with a gas input 21 arranged to provide gas blowing through the slit gap into the vacuum pump 22 at a gas pressure in the slit gap more than 20 Pa. The gas may be of the same as the protective gas, such as argon, but is not limited to this option.

The vacuum pump is installed so that the flow of blowing gas passes through the bearings 8, cooling them. In addition to this, the bearings 8 are equipped by an additional heat exchanger 23 with flow of a cooling liquid 24.

Gas conductivity and area of contact are sufficient to remove up to 1.5 kW of thermal power for this type of cooling, illustrated by FIG. 1.

At the same time, further cooling methods may be used for the rotating target assembly. The following embodiments of the invention are focused at further improving the complex of means for cooling the rotating target assembly.

Figure 2:
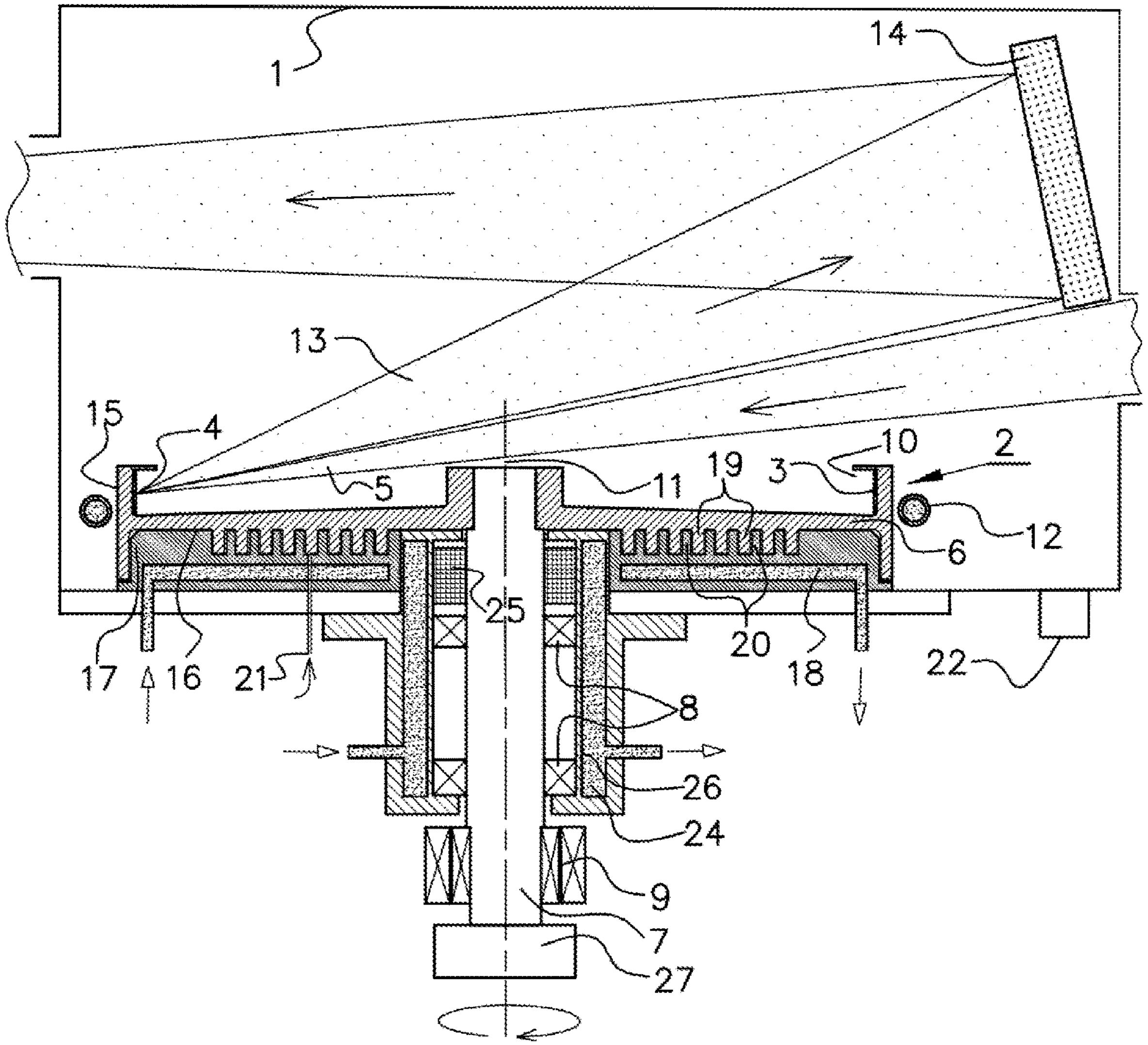

FIG. 2 illustrates an embodiment of the invention, wherein the bearings 8 of the shaft 7 and electric motor 9 are located outside the vacuum chamber 1 in surrounding atmosphere. In this embodiment sealing between the vacuum chamber and the rotating shaft 7 is provided by a magnetic fluid seal (MFS) 25, while the bearings 8 and MFS 25 are equipped by an additional heat exchanger 26 with flow of a cooling liquid 24.

The submillimeter layer of MFS liquid provides high thermal conductivity and accordingly highly efficient cooling of the rotating target assembly 2 through the shaft 7 and the nominal temperature regime of the bearings 8.

Along with this a counterweight 27 of the rotating target assembly is fixed to the shaft outside the vacuum chamber. The counterweight is designed both to dampen vibrations of the rotating target assembly and for convection air cooling, which ensures further heat removal from the rotating target assembly through the shaft 7. Suppression of vibration of the rotating target assembly increases spatial stability and ensures high brightness of the LPP EUV light source.

Preferably the electric motor 9 is a brushless DC electric motor. Advantages of Brushless DC Motor over brushed are as follows: higher efficiency, longer lifespan, low maintenance, high torque-to-weight ratio, precise speed control, quiet operation, reduced electromagnetic interference, high power density, improved heat dissipation, smoother operation, higher rpm, digital control, higher starting torque, energy efficiency, better thermal management, compact design, quick response, no brush dust, higher overload capacity, high durability, low electromagnetic noise, wide temperature range, low inertia, digital feedback, remote operation, improved reliability, reduced vibration, higher stall torque, reduced eddy current losses, soft start, total cost of ownership, enhanced speed stability, integrated electronics, reduced emissions.

The high-brightness laser-produced plasma light source is operated as described below and illustrated by FIG. 1 and FIG. 2.

The vacuum chamber 1 is evacuated using the oil-free vacuum pump system 22 to the pressure below $10^{-5}$ . . . $10^{-11}$ mbar. At the same time, gas components, such as nitrogen, oxygen, carbon, etc., capable of interacting with the target material and of contaminating the collector mirror, are removed.

The target material which belongs to the group of non-toxic fusible metals including Sn, Li, In, Ga, Pb, Bi, Zn, Ag, Au and alloys thereof is transferred into a molten state in the pre-defined optimum temperature range using a fixed heating system 12 which may employ induction heating.

In preferred embodiments of the invention, the EUV light source has a maximum spectral brightness at a wavelength of 13.5 nm, but is not limited to this.

In another embodiment of the invention, the EUV radiation source may have a maximum spectral brightness in the wavelength range of 6.6-6.8 nm, and the target material contains gadolinium (Gd) or terbium (Tb) or their compounds in the form of a refractory powder.

The rotating target assembly 2 is actuated using the rotating drive unit. Under the action of the centrifugal force, the target 3 is formed as the molten metal layer on the surface of the annular groove facing the rotation axis 6. At a centrifugal acceleration of at least 3000 g the target surface is substantially parallel to the rotation axis.

The target 3 is exposed to the focused laser beam 5 with a high pulse repetition rate that can be in the range of 10 kHz to 100 kHz or higher. Short-wavelength light is generated by the focused laser beam 5 heating the target material to a plasma-forming temperature. Depending on the laser radiation power density in the focal spot and the target material, the laser-produced plasma emits light in the short-wavelength range including wavelengths of 5 to 120 nm.

The output beam 7 is coming out of the high-temperature plasma through the means for debris mitigation into an optical collector 14. Due to fast target rotation, the droplet fraction of debris particles ejecting from the interaction zone acquires a significant tangential velocity component comparable to the linear target velocity. Accordingly, the resulting vector of the droplets velocity is largely redirected from the cones of laser beam 5 and output beam 7.

The method of cooling LPP EUV light source is implemented as described below and illustrated by FIG. 1 and FIG. 2.

The heat transfer from the fast rotating target, absorbing laser radiation of high average power, is ensured in several ways including thermal radiation of an outer surface 15 of a peripheral part of the rotating target assembly 2 made with as large surface area as possible. To increase heat transfer, the surface of the peripheral part of the disk of the rotating target assembly has a coating with high, more than 0.7, emissivity.

Heat transfer from the target is also provided via the narrow slit gap 16 between the disk 6 of the rotating target assembly and the liquid-cooled heat exchanger 17 rigidly installed in the vacuum chamber, fixed relative to it.

To enhance cooling by increasing the surface areas involved in heat transfer, the slit gap 16 has the shape of a meander in the cross-section plane passing through the axis of rotation 11 and the slit gap size is less than 0.5 mm. To improve heat exchange the surfaces of the disk 6 of the rotating target assembly and of the heat exchanger 17, located on both sides of the slit gap 16, have coatings with high emissivity, more than 0.7.

To further improve the cooling efficiency of the rotating target assembly the heat exchanger is equipped with a gas input 21 arranged to provide gas blowing through the slit gap at a gas pressure in the slit gap more than 20 Pa. The gas may be argon, but is not limited to this option.

Gas conductivity and area of contact are sufficient to remove up to 1.5 kW of thermal power for this type of cooling.

In embodiments of the invention illustrates by FIG. 2 further increase cooling efficiency of fast rotating target is provided due to sealing rotating shaft 7 by a magnetic fluid seal (MFS) 25, while bearings 8 of the shaft 7, electric motor 9 and counterweight 27 are located outside the vacuum chamber 1 in surrounding atmosphere and the bearings 8 and MFS 25 are equipped by an additional liquid-cooled heat exchanger 26.

The submillimeter layer of MFS liquid provides high thermal conductivity and, accordingly, highly efficient cooling of the rotating target assembly 2 through the shaft 7 and the nominal temperature regime of the bearings 8.

Another way of cooling the rotating target assembly through the shaft is by convective heat exchange between the disk counterweight 26 mounted on the shaft and the atmospheric air. Due to the high thermal conductivity of the shaft material and the high linear velocity of the counterweight, this cooling method is also high effective.

The simultaneous use in LPP EUV source of all the methods described above for cooling the rotating target assembly makes it possible to increase the output power of the light source several times by increasing the laser input power, while ensuring an acceptable temperature of both the target itself and shaft bearings.

On the whole, cooling the rotating target assembly in accordance with the present invention allows the LPP EUV light source to operate with an average laser power of several kilowatts at the target.

Thus, the present invention provides for creating LPP EUV light sources characterized by a high average power, high brightness, a long lifetime, and by the ease of use.

INDUSTRIAL APPLICATION

The proposed devices are intended for a number of applications, including microscopy, materials science, X-ray diagnostics of materials, biomedical and medical diagnostics, inspection of nano- and microstructures and lithography, including actinic control of lithographic EUV masks.

The invention claimed is:

1. A laser produced plasma (LPP) source for extreme ultraviolet (EUV) or vacuum ultraviolet (VUV) light, comprising: a vacuum chamber with a rotating target assembly having a rotation drive unit and a part made in a form of a disk with a barrier on an inner surface of which there is an annular groove with a target material supplied to an interaction zone with a focused beam of a high-repetition-rate pulsed laser, and a beam of EUV plasma light coming out from the interaction zone, wherein a heat exchanger with a liquid cooling is installed in the vacuum chamber, fixed relative to the vacuum chamber; and wherein a part of a heat exchanger surface is separated from the surface of the rotating target assembly disk by a slit gap or clearance, wherein the light source having an outer surface of a peripheral part of the rotating target assembly is made with a relatively large surface area S exceeding $0.5 \times R^2$, where R is a rotating target assembly outer radius, and wherein the outer surface has a coating with a relatively high emissivity of more than 0.7.

2. The LPP EUV light source according to claim 1, wherein parts of the heat exchanger and the disk of the rotating target assembly, facing each other, are each equipped with concentric annular fins and the concentric annular fins of the rotating target assembly are located between the concentric annular fins of the heat exchanger.

3. The LPP EUV light source according to claim 1, wherein the slit gap has a shape of a meander in a cross-section plane passing through an axis of rotation of the rotating target assembly.

4. The LPP EUV light source according to claim 1, wherein the surfaces of the disk of the rotating target assembly and of the heat exchanger, that are located on both sides of the slit gap, have coatings with high emissivity, more than 0.7, produced by micro-arc oxidation.

5. The LPP EUV light source according to claim 1, wherein a gas input is arranged to provide a gas blowing through the slit gap at a gas pressure in the slit gap of more than 20 Pa.

6. The LPP EUV light source according to claim 1, wherein a size of the slit gap is less than 0.5 mm.

7. The LPP EUV light source according to claim 1, wherein the rotation drive unit comprises a shaft, mounted on bearings and an electric motor connected by the shaft to the disk of the rotating target assembly, said bearings and the electric motor are located outside the vacuum chamber, wherein a sealing between the vacuum chamber and the shaft is provided by a magnetic fluid seal, and the bearings and the magnetic fluid seal are equipped with an additional heat exchanger with a liquid cooling.

8. The LPP EUV light source according to claim 7, wherein a counterweight of the rotating target assembly is fixed on the shaft outside the vacuum chamber, and the counterweight is arranged for a convection air cooling.

9. The LPP EUV light source according to claim 7, wherein the electric motor is a brushless DC electric motor.

10. The LPP EUV light source according to claim 1, wherein the rotating target assembly has a linear velocity of at least 100 m/s, a centrifugal acceleration of at least 3000 g, where g is the standard acceleration of gravity and the target material has obtained fluidity under a centrifugal force.

11. A method for cooling a LPP EUV light source, that is a source according to claim 1, wherein the cooling is provided by thermal radiation of the peripheral part of the rotating target assembly, further with providing a heat exchange through the slit gap between the disk of the rotating target assembly and the heat exchanger with the liquid cooling fixed relative to the vacuum chamber, while the surfaces of both the disk and the heat exchanger located on both sides of the slit gap have the coatings with high, more than 0.7, emissivity.

12. The method for cooling the LPP EUV light source, according to claim 11, wherein a gas is blown into the vacuum chamber through the slit gap between the rotating target assembly and the heat exchanger.

13. The method for cooling LPP EUV light source, according to claim 11, wherein a drive unit comprises a shaft, mounted on bearings and an electric motor connected by the shaft to the disk of the rotating target assembly, the bearings and the electric motor are located outside the vacuum chamber, a sealing between the vacuum chamber and the shaft is provided by a magnetic fluid seal (MFS), the bearings and MFS are equipped with an additional heat exchanger with the liquid cooling, and a counterweight of the rotating target assembly is fixed on the shaft outside the vacuum chamber and a heat transfer from the disk of rotating target assembly is provided through the MFS with the additional heat exchanger and by convection air cooling of the counterweight rotating on the shaft.

* * * * *